United States Patent
Xue et al.

(10) Patent No.: US 11,571,352 B2
(45) Date of Patent: Feb. 7, 2023

(54) ASSISTED EXOSKELETON REHABILITATION DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Bangcan Xue, Beijing (CN); Yanjun Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 511 days.

(21) Appl. No.: 16/488,730

(22) PCT Filed: Jan. 29, 2019

(86) PCT No.: PCT/CN2019/073702
§ 371 (c)(1),
(2) Date: Aug. 26, 2019

(87) PCT Pub. No.: WO2019/184589
PCT Pub. Date: Oct. 3, 2019

(65) Prior Publication Data
US 2021/0353493 A1 Nov. 18, 2021
US 2022/0233388 A9 Jul. 28, 2022

(30) Foreign Application Priority Data
Mar. 29, 2018 (CN) .......................... 201810272761.0

(51) Int. Cl.
A61H 1/00 (2006.01)
A61H 1/02 (2006.01)
B25J 9/00 (2006.01)

(52) U.S. Cl.
CPC ......... *A61H 1/0281* (2013.01); *A61H 1/0244* (2013.01); *A61H 1/0277* (2013.01);
(Continued)

(58) Field of Classification Search
CPC .. A61H 1/0281; A61H 1/0244; A61H 1/0277; A61H 1/0292; A61H 2201/1642;
(Continued)

(56) References Cited

U.S. PATENT DOCUMENTS

2006/0161220 A1* 7/2006 Kobayashi ........... A61H 1/0277
607/49
2010/0204804 A1 8/2010 Garrec
(Continued)

FOREIGN PATENT DOCUMENTS

CN 101181177 A 5/2008
CN 102793595 A 11/2012
(Continued)

OTHER PUBLICATIONS

PCT International Search Report, Application No. PCT/CN2019/073702, dated Apr. 17, 2019, 8 pages: with English translation.
(Continued)

*Primary Examiner* — Timothy A Stanis
(74) *Attorney, Agent, or Firm* — Armstrong Teasdale LLP

(57) ABSTRACT

The present disclosure relates to an assisted exoskeleton rehabilitation device, comprising: a back structure comprising a back crossbeam, a back supporting panel with an adjustable length, and a shoulder pneumatic muscle element mounted on the back supporting panel; an arm structure; a shoulder joint assembly, by which the arm structure is
(Continued)

connected to an upper end of the back structure; and a waist structure. An upper end of the back supporting panel is fixedly connected to the back crossbeam, and a lower end thereof is fixedly connected to the waist structure. The shoulder joint assembly comprises a curved shoulder joint connecting panel, a shoulder traction wheel, a shoulder traction line, a first hinge mechanism and a second hinge mechanism. One end of the shoulder joint connecting panel is connected to the upper end of the arm structure by the first hinge mechanism to form a bend-stretch revolute pair of the shoulder joint, and the other end of the shoulder joint connecting panel is connected to the back crossbeam by the second hinge mechanism to form an abduction-adduction revolute pair and a medial rotation-lateral rotation revolute pair of the shoulder joint assembly, and the shoulder traction wheel is fixed to the upper end of the arm structure. The shoulder traction line is connected at one end to the shoulder traction wheel, and connected to the shoulder pneumatic muscle element at the other end.

10 Claims, 7 Drawing Sheets

(52) U.S. Cl.
CPC .......... *A61H 1/0292* (2013.01); *B25J 9/0006* (2013.01); *A61H 2201/165* (2013.01); *A61H 2201/1642* (2013.01); *A61H 2201/5056* (2013.01)

(58) Field of Classification Search
CPC ....... A61H 2201/165; A61H 2201/5056; B25J 9/0006
See application file for complete search history.

(56) References Cited

U.S. PATENT DOCUMENTS

| 2011/0214524 | A1* | 9/2011 | Jacobsen | A61H 1/0266 |
| | | | | 74/490.04 |
| 2013/0090580 | A1* | 4/2013 | Hong | A61H 1/0277 |
| | | | | 601/33 |
| 2016/0058647 | A1* | 3/2016 | Maddry | A61B 5/389 |
| | | | | 623/26 |
| 2017/0065441 | A1* | 3/2017 | Lee | A61H 1/0255 |
| 2017/0173783 | A1* | 6/2017 | Angold | B25J 9/109 |
| 2017/0252254 | A1* | 9/2017 | Velazquez Nino | A61H 3/00 |
| 2017/0296418 | A1* | 10/2017 | Lee | A61H 1/0277 |
| 2018/0110669 | A1* | 4/2018 | Rodriguez Leal | A61H 3/00 |

FOREIGN PATENT DOCUMENTS

| CN | 103465253 A | 12/2013 |
| CN | 206643909 U | 11/2017 |
| CN | 107671848 A | 2/2018 |
| JP | 2012239818 A | 12/2012 |
| KR | 1694369 B1 | 1/2017 |
| WO | 2015084177 A1 | 6/2015 |
| WO | 2017157875 A1 | 9/2017 |

OTHER PUBLICATIONS

PCT Written Opinion, Application No. PCT/CN2019/073702, dated Apr. 17, 2019, 5 pages.: with English translation of relevant part.
Japan Notice of Reasons for Refusal, Application No. 2020-536632, dated Nov. 4, 2022, 8 pps.: with English translation.

* cited by examiner

ASSISTED EXOSKELETON REHABILITATION DEVICE

CROSS REFERENCE TO RELATED APPLICATIONS

This patent application is a National Stage Entry of PCT/CN2019/073702 filed on Jan. 29, 2019, which claims the benefit and priority of Chinese Patent Application No. 201810272761.0 filed on Mar. 29, 2018, the disclosures of which are incorporated by reference herein in their entirety as part of the present application.

BACKGROUND

Embodiments of the present disclosure relate to the field of biomimetic machinery, and in particular, to an assisted exoskeleton rehabilitation device driven by pneumatic muscles.

In modern society, it is necessary to develop an assisted exoskeleton device to provide limbs and body support services for care workers when they carrying the elderly or patients. This can greatly reduce the physical labor intensity of the care workers while ensuring the safety of both patients and care workers, so that the care workers can work in an easy and efficient manner. For the elderly with degenerative muscle function, an assisted exoskeleton device can help them carry out self-service in their daily life. For patients with arm injuries, an exoskeleton device can help them perform daily rehabilitation training, so that they can quickly restore their body functions.

The assisted exoskeleton rehabilitation device is a typical human-machine integrative system that performs specified functions and tasks under the control of the wearer by means of such technologies as sensing, control, information acquisition, and mobile computing. Most of the existing exoskeletons are driven by conventional motors, hydraulic cylinders, pneumatic cylinders, etc. This traditional driving method has the disadvantages of high cost, low power/mass ratio, oil leakage, and poor flexibility. Consequently, the exoskeleton product is too heavy to meet the requirements of portability and flexibility. Moreover, the price of exoskeleton product is high, such that it cannot be used widely.

BRIEF DESCRIPTION

The present disclosure provides an assisted exoskeleton rehabilitation device having the advantages of simple structure, high safety, and high flexibility.

The present disclosure provides an assisted exoskeleton rehabilitation device. The assisted exoskeleton rehabilitation device includes a back structure including a back crossbeam, a back supporting panel with an adjustable length, and a shoulder pneumatic muscle element mounted on the back supporting panel, an arm structure, a shoulder joint assembly, by which the arm structure is connected to an upper end of the back structure, and a waist structure, wherein an upper end of the back supporting panel is fixedly connected to the back crossbeam, and a lower end of the back supporting panel is fixedly connected to the waist structure, wherein the shoulder joint assembly includes a curved shoulder joint connecting panel, a shoulder traction wheel, a shoulder traction line, a first hinge mechanism and a second hinge mechanism, one end of the shoulder joint connecting panel is connected to the upper end of the arm structure by the first hinge mechanism to form a bend-stretch revolute pair of the shoulder joint assembly, and the other end of the shoulder joint connecting panel is connected to the back crossbeam by the second hinge mechanism to form an abduction-adduction revolute pair and a medial rotation-lateral rotation revolute pair of the shoulder joint assembly, and the shoulder traction wheel is fixed to the upper end of the arm structure, the shoulder traction line is connected at one end to the shoulder traction wheel, and connected to the shoulder pneumatic muscle element at the other end.

In one embodiment of the present disclosure, there are also provided two thigh structures and a hip joint assembly. The two thigh structures are connected to the waist structure respectively through the hip joint assembly. The waist structure includes a waist transverse panel fixedly connected to a lower end of the back supporting panel and a waist pneumatic muscle element mounted on the thigh structure, the hip joint assembly includes a waist connection panel fixedly connected to the waist transverse panel, a hinged shaft, a first guide wheel fixed to the waist connection panel, a second guide wheel fixed to the thigh structure, and a waist traction line, wherein the hinge shaft connects the waist connection panel to the thigh structure to form a bend-stretch revolute pair of the hip joint, one end of the waist traction line extends through the second guide wheel and the first guide wheel and is fixed to the waist connection panel, and the other end thereof is connected to the waist pneumatic muscle element.

In one embodiment of the present disclosure, the thigh structure includes a thigh panel and a thigh guarding bracket, wherein a waist pneumatic muscle support is provided on the thigh panel for mounting the waist pneumatic muscle element, and a belt connection groove is provided on the thigh guarding bracket for connecting the thigh belt.

In one embodiment of the present disclosure, there are provided two arm structures, each of said arm structures including an upper arm assembly, an elbow joint member, a forearm assembly, a wrist joint member, and a hand assembly, wherein an upper end of the upper arm assembly is connected to the shoulder joint connecting panel by the first hinge mechanism, and a lower end of the upper arm assembly is connected to the forearm assembly by the elbow joint member to form a bend-stretch revolute pair of the elbow joint assembly, while the forearm assembly is connected to the hand assembly by the wrist joint member to form a bend-stretch revolute pair of the wrist joint assembly.

In one embodiment of the present disclosure, each of said upper arm assemblies includes an outer upper arm panel, an inner upper arm panel, and an upper arm guarding bracket for fixing and connecting the outer upper arm panel and the inner upper arm panel, each of said forearm assemblies includes an outer forearm panel, an inner forearm panel, and a forearm guarding bracket for fixing and connecting the outer forearm panel and the inner forearm panel, and the hand assembly includes an inner supporting panel, an outer supporting panel, and a hand guarding bracket for fixing and connecting the inner supporting panel and the outer supporting panel, wherein both the outer upper arm panel and the inner upper arm panel are provided with a first elbow pneumatic muscle support, each of the outer forearm panel and the inner forearm panel is provided with a second elbow pneumatic muscle support and a first wrist pneumatic muscle support, and each of the inner supporting panel and the outer supporting panel is provided with a second wrist pneumatic muscle support, an elbow pneumatic muscle element is mounted on each of the first elbow pneumatic muscle support and the second elbow pneumatic muscle support respectively for driving pivotal movement of the elbow joint assembly, and a wrist pneumatic muscle element is mounted on each of the first wrist pneumatic muscle support and the second wrist pneumatic muscle support respectively for driving pivotal movement of the wrist joint assembly.

One embodiment of the present disclosure provides an upper arm guarding belt, a forearm guarding belt, and a hand guarding belt, wherein an upper arm guarding belt connecting slot is provided on each of the outer upper arm panel and the inner upper arm panel for connecting the upper arm guarding belt, and a forearm guarding belt connecting slot is provided on both the outer forearm panel and the inner forearm panel for connecting the forearm guarding belt, a hand guarding belt connecting slot is provided on each of the inner supporting panel and the outer supporting panel for connecting the hand guarding belt, and a groove for hanging heavy objects is provided on each of the inner supporting panel and the outer supporting panel.

In one embodiment of the present disclosure, both ends of the back crossbeam are respectively provided with a sliding groove, the second hinge mechanism includes a hinged shaft and a hinged seat configured to have a cylindrical end, and have a groove portion adapted to receive the shoulder joint connecting panel at the other end, wherein the two side walls of the groove portion are provided with an opening, and the shoulder joint connecting panel is connected to the hinged seat through cooperation between the hinged shaft and the opening to form an abduction-adduction revolute pair of the shoulder joint assembly, the cylindrical end of the hinged seat is rotatably received in the sliding groove and located by a positioning bolt to block the hinged seat from moving linearly within the sliding groove, so as to form a medial rotation-lateral rotation revolute pair of the shoulder joint assembly.

In one embodiment of the present disclosure, the assisted exoskeleton rehabilitation device is further provided with a shoulder traction line conduit for guiding the shoulder traction line, and a waist traction line support is disposed on the waist connection panel for fixing the waist traction line.

Advantageously, the back supporting panel includes two supporting panels, each of the supporting panels having a first section and a second section which are slidable relative to each other, such that a length of the supporting panel can be adjusted, and thereby a waist position can be adjusted, a positioning sliding groove is disposed on the first section and the second section respectively, and the first section and the second section can be fastened through cooperation between the positioning sliding groove and a locking screw.

The present disclosure further provides an assisted exoskeleton rehabilitation system, including a control system and an assisted exoskeleton rehabilitation device, the control system including a gas source generator, a controller, a pneumatic pressure reducing valve, a solenoid valve group connected to the shoulder pneumatic muscle element, the waist pneumatic muscle element, the elbow pneumatic muscle element, and the wrist pneumatic muscle element respectively, and a driving circuit board disposed between the controller and the solenoid valve group, wherein the controller is for controlling the pneumatic pressure reducing valve to decompress a gas from the gas source generator, a signal input end of the solenoid valve group is connected to the driving circuit board which is configured to receive a preset control instruction from the controller.

The present disclosure further provides a method for controlling the assisted exoskeleton rehabilitation device, including controlling the pneumatic pressure reducing valve to decompress a gas from gas source generator by means of a controller; controlling the solenoid valve group respectively connected to the shoulder pneumatic muscle element, the waist pneumatic muscle element, the elbow pneumatic muscle element, and the wrist pneumatic muscle element based on a control instruction from the controller, so as to control the inflation and deflation of the shoulder pneumatic muscle element, the waist pneumatic muscle element, the elbow pneumatic muscle element, and the wrist pneumatic muscle element.

The assisted exoskeleton rehabilitation device according to the present disclosure has 12 degrees of freedom, each of the two shoulder joint assemblies has 3 degrees of freedom, i.e. bend-stretch degree of freedom, abduction-adduction, and medial rotation-lateral rotation, and the elbow joint and the wrist joint each has one degree of freedom, i.e. bend-stretch degree of freedom. The back structure can slide up and down to adjust the waist position. The waist structure includes two hip joint assemblies of the same structure, each having a rotational degree of freedom, which enables the assisted exoskeleton rehabilitation clothing to make bending and standing movement following the wearer. The present disclosure has the advantages of simple structure, high power density ratio, high safety and high flexibility, can greatly improve the body capacity of the wearer when he lifts heavy objects, and can be widely applied to the fields such as rehabilitation treatment, family service, disaster relief, and material transfer.

BRIEF DESCRIPTION OF THE DRAWINGS

The above and/or additional aspects and advantages of the present disclosure will be apparent and readily understood from the embodiments illustrated below with reference to the drawings, in which.

DETAILED DESCRIPTION

Figure 1:
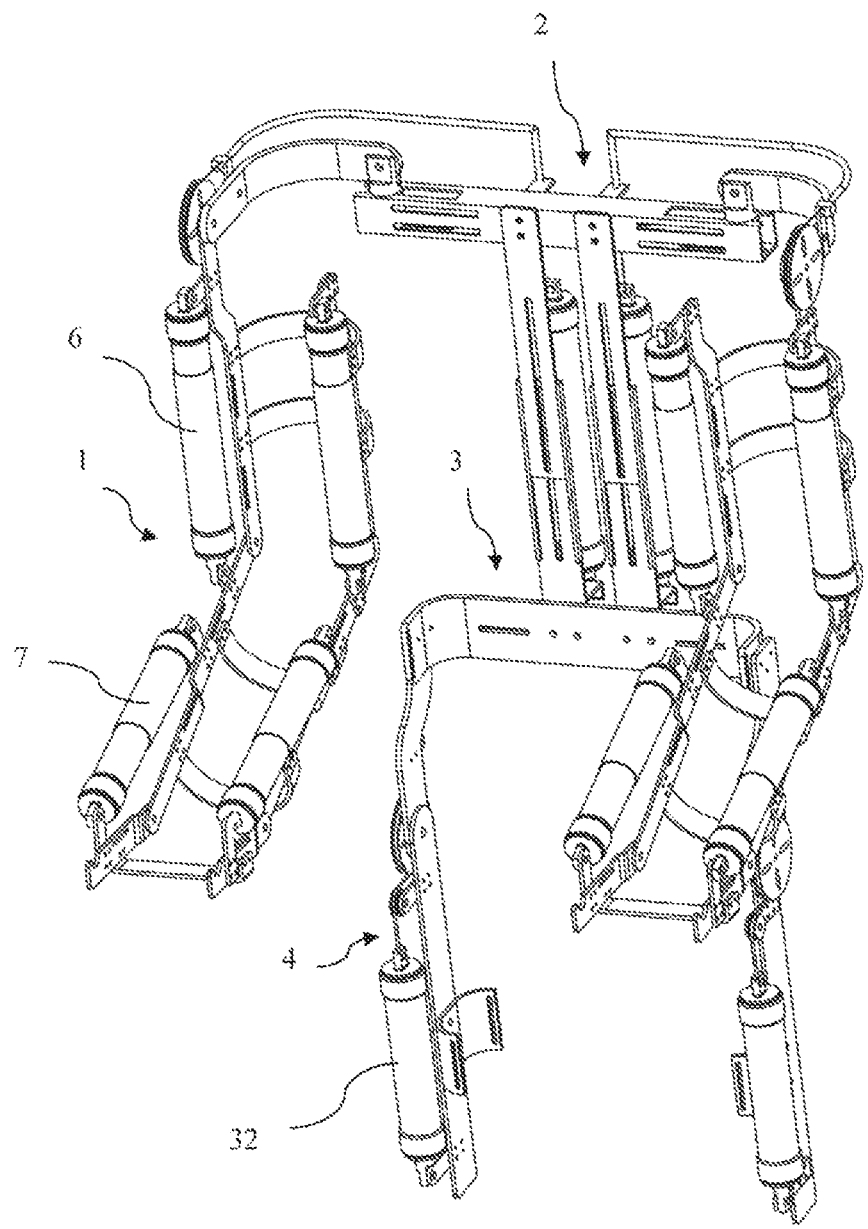
FIG. 1 is a schematic view of an overall structure of an assisted exoskeleton rehabilitation device according to one embodiment of the present disclosure.

The embodiments of the present disclosure will be illustrated in detail below, examples of which are shown in the drawings, wherein the same or like reference numerals will be used to refer to the same or like elements or elements with the same or similar functions. The embodiments described below with reference to the accompanying drawings are exemplary only, and shall be only for the purpose of interpreting but not for limiting the present disclosure.

Figure 10:
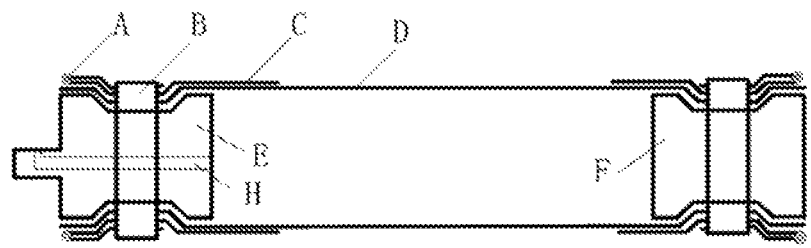
FIG. 10 is a schematic view of a pneumatic muscle.

Firstly, the technical principle of the pneumatic muscle element is explained. FIG. 10 is a schematic view of a pneumatic muscle element according to the present disclosure. The pneumatic muscle element is a new type of driver, and its main body is a rubber tube D. An outer side of the rubber tube is covered with a woven mesh C made of PET material. Two ends of the rubber tube D are sleeved on sealing plugs E,F disposed at both ends thereof. The sealing plug F at one end is not provided with an air hole, but completely blocks the rubber tube to prevent air leakage, and the other sealing plug E at the other end has an air hole H for inflation or deflation of the pneumatic muscle element. Then the rubber tube D and the woven mesh C are wound 2-3 turns by an adhesive tape at the concave portion of each of the sealing plug E and F for firmly bonding the rubber tube and the woven mesh together at the concave portion of each sealing plug. A copper wire A is wound around edges of the concave portion of each sealing plug to prevent the woven mesh C from being disengaged under high pressure, and then the woven mesh C is folded, and the copper wire is arranged at a bend of the woven mesh C at the end. The folded woven mesh extends to a position at the tail of the seal, and the concave portion of each of the sealing plugs E,F are tightened by a clamp B to prevent the pneumatic muscle element from leaking air and breaking up under internal high pressure. The sealing plugs E and F are designed flexibly, and may be connected differently according to the connection mode.

It is required that the rubber tube D have certain toughness and elasticity, may expand and contract under inflation and deflation, and have good fatigue resistance. The woven mesh C should have high non-ductility, excellent strength and toughness, but no tensile deformation. The sealing plugs E and F may be made of a hard non-metallic material with high compactness, or a metal material with high strength and low density. The clamp B may be a commonly used stainless steel clamp, or a self-designed aluminum alloy member with high strength.

Pneumatic muscle is a new type of driver that can imitate contraction of biological muscles. It is widely used for driving various bionic machinery owing to such advantages as high flexibility, light weight, convenient use, fast response, and low cost.

Compared with traditional rigid drivers such as motors, hydraulic cylinders and pneumatic cylinders, the pneumatic muscle has such advantages as high power/quality ratio, good flexibility, high safety, light weight, easy access to material, easy manufacturing, and low cost. Therefore, the assisted exoskeleton rehabilitation device driven by the pneumatic muscle enables light weight, good flexibility, high safety, and low cost while ensuring a large driving force, and therefore can be widely used.

In the process of inflating the pneumatic muscle element, the pneumatic muscle element will expand radially and contract axially, and an external load may be driven by means of the axial driving force generated by the axial contraction. As the internal pressure increases, the rigidity of the pneumatic muscle element increases, and as the internal pressure decreases, the rigidity thereof decreases. According to the characteristics, the pneumatic muscle element can be used as a new type of linear driver. Compared with traditional drivers such as hydraulic cylinder, pneumatic cylinder, and motor, it has light weight. Furthermore, according to the needs of the driving stroke, the length of the pneumatic muscle element can be designed in combination with its contraction rate to avoid danger caused by overtravel. And its cost is very low. More importantly, the pneumatic muscle element has good flexibility and high safety, and can be widely used in the field of medical rehabilitation.

The present disclosure is now described in detail below in conjunction with an assisted exoskeleton rehabilitation device according to one embodiment of the present disclosure.

As shown in FIG. 1, in one embodiment, the assisted exoskeleton rehabilitation device may include, for example, two arm structures 1, one back structure 2, one waist structure 3, and two identical thigh structures 4. Each of the arm structures 1 is connected to the back structure 2 by a shoulder joint assembly, and has an elbow joint member and a wrist joint member, wherein each arm structure has 5 degrees of freedom, and each shoulder joint assembly has 3 degrees of freedom, i.e. bend-stretch, abduction-adduction, and medial rotation-lateral rotation, and the elbow joint member and the wrist joint member each has one degree of freedom, i.e. bend-stretch degree of freedom. Each thigh structure 4 is connected to the waist structure 3 by a hip joint assembly and has one degree of freedom, i.e. bend-stretch degree of freedom. Therefore, the whole assisted exoskeleton rehabilitation device has 12 degrees of freedom.

Figure 2:
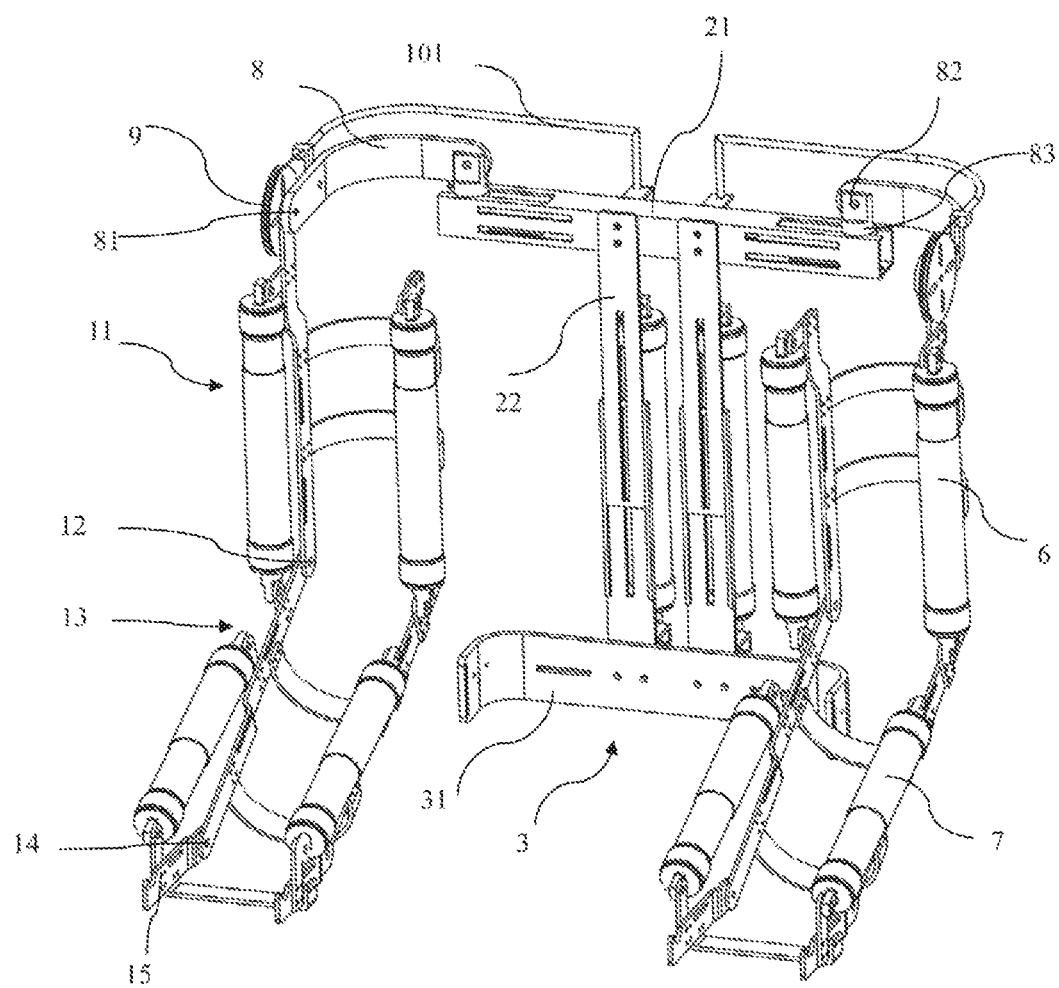
FIG. 2 is a schematic view of an upper structure of the assisted exoskeleton rehabilitation device shown in FIG. 1.
Figure 3:
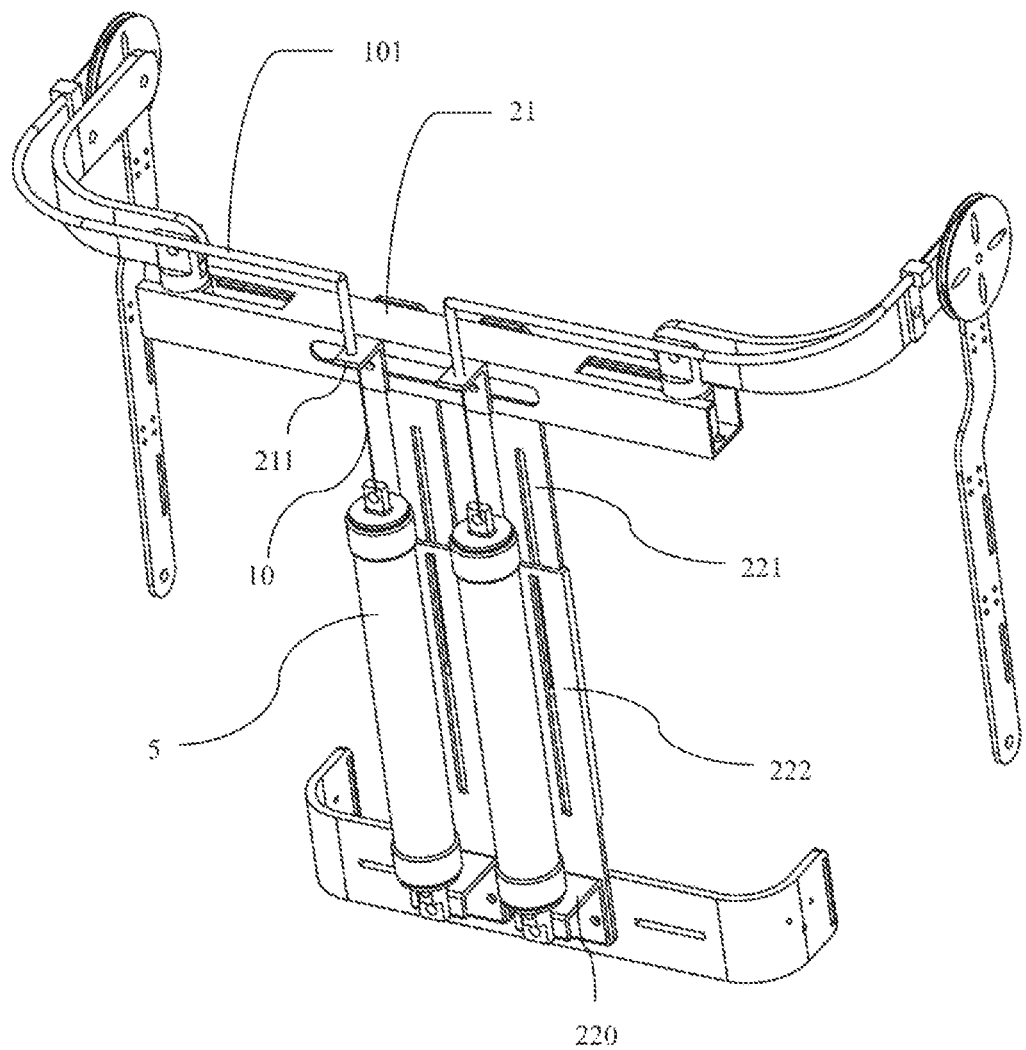
FIG. 3 is a schematic view of a back structure of the assisted exoskeleton rehabilitation device shown in FIG. 1.

FIG. 2 and FIG. 3 respectively show the upper structure and back structure of the assisted exoskeleton rehabilitation device in the above embodiment. As can be seen from the figures, each arm structure 1 includes an upper arm assembly 11, an elbow joint member 12, a forearm assembly 13, a wrist joint member 14, and a hand assembly 15. The back structure 2 includes a back crossbeam 21 and two back supporting panels 22. Two first shoulder pneumatic muscle supports 211 are disposed on the back crossbeam 21, one end of each back supporting panel 22 is fixedly connected to the back crossbeam 21, and the other end thereof is provided with a second shoulder pneumatic muscle support 220. Each of the back supporting panels 22 is mounted with a shoulder pneumatic muscle element 5, one end of which is fixedly connected to the first shoulder pneumatic muscle support 211, and the other end of which is fixedly connected to the second shoulder pneumatic muscle support 220 for driving pivotal movement of the shoulder joint member. It is understood by those skilled in the art that the number of the back supporting panels and shoulder pneumatic muscle elements here is merely illustrative. Other suitable numbers can be selected as needed.

Advantageously, the back supporting panel 22, which has an adjustable length, is configured to adjust the position of the waist structure. Referring to FIG. 3, each back supporting panel 22 has a first section 221 and a second section 222 which are slidable relative to each other, e.g. the first section is slidably received in the second section, each of the first section 221 and the second section 222 has a positioning sliding groove. The first section and the second section can be locked through a cooperation between the positioning sliding groove and a locking bolt to prevent relative movement therebetween. When the waist position needs to be adjusted, the locking bolt can be released, so that the first section and the second section slide relatively to a desired position to adjust the length of the back supporting panel.

Figure 7A:
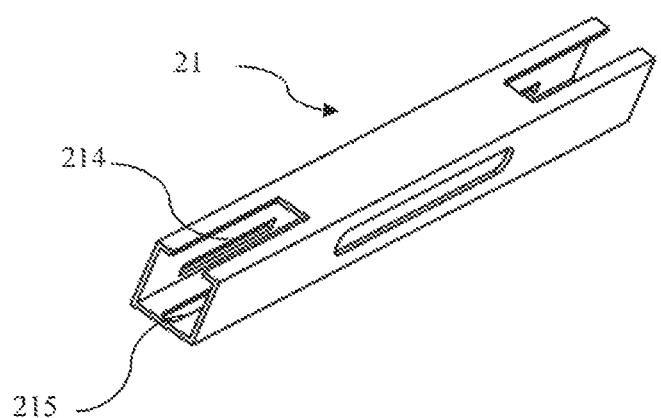
FIGS. 7A and 7B are schematic views of a back crossbeam of the assisted exoskeleton rehabilitation device shown in FIG. 1.
Figure 7B:
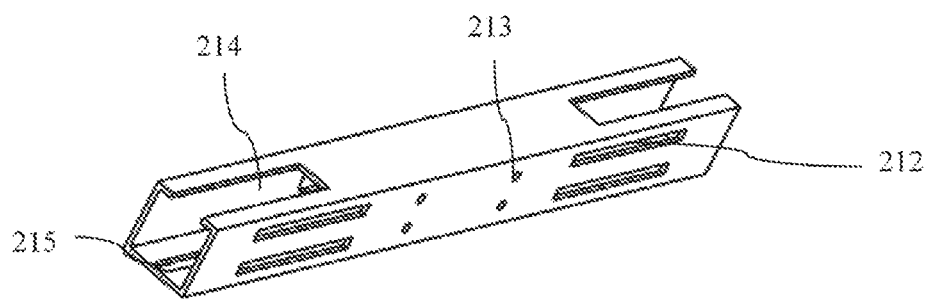

FIGS. 7A and 7B respectively show the structure of the back crossbeam from different directions. As can be seen from the figures, the back crossbeam 21 is further provided with a belt connecting slot 212, a back support plate positioning hole 213, a connecting sliding groove 214, and a positioning groove 215. The belt connecting slot 212 is connected to the wearer's back by connecting the back guarding belt (not shown).

Figure 6:
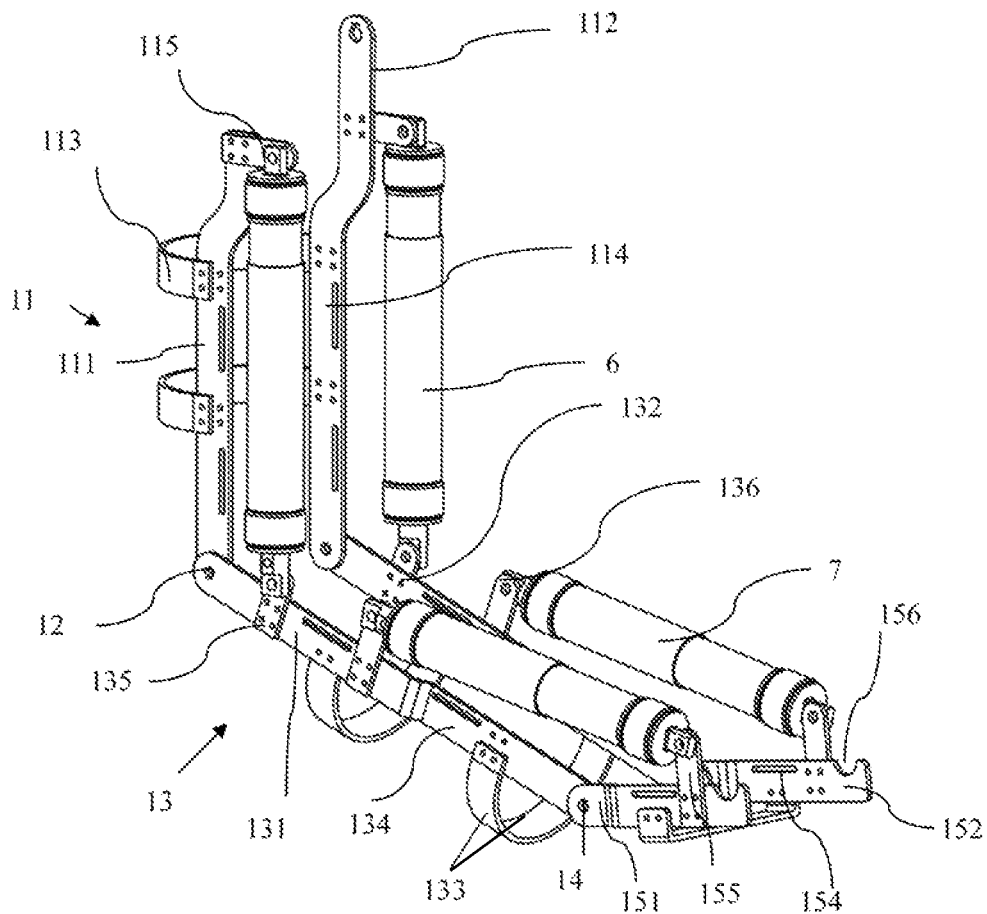
FIG. 6 is a partial schematic view of an outer upper arm of the assisted exoskeleton rehabilitation device shown in FIG. 1.

In addition, referring to FIG. 6, taking the left arm structure as an example, each upper arm assembly 11 includes an outer upper arm panel 111, an inner upper arm panel 112, and an upper arm guarding bracket 113 for fixedly connecting the outer upper arm panel 111 and the inner upper arm panel 112 to each other. An upper arm guarding belt connecting slot 114 is disposed on the outer upper arm panel 111 and the inner upper arm panel 112 respectively for connecting the upper arm guarding belt (not shown), thereby connecting the wearer's upper arm. In addition, a first elbow pneumatic muscle support 115 is disposed on each of the outer upper arm panel 111 and the inner upper arm panel 112.

Each forearm assembly 13 may include an outer forearm panel 131, an inner forearm panel 132, and a forearm guarding bracket 133 for fixedly connecting the outer forearm panel 131 and the inner forearm panel 132 each other. A forearm guarding belt connecting slot 134 is disposed on the outer forearm panel 131 and the inner forearm panel 132 respectively for connecting the forearm guarding belt (not shown) thereby connecting the wearer's forearm. Besides, a second elbow pneumatic muscle support 135 and a first wrist pneumatic muscle support 136 are disposed on both the outer forearm panel 131 and the inner forearm panel 132.

Each hand assembly 15 may include an outer supporting panel 151, an inner supporting panel 152, and a hand guarding bracket 153 for fixedly connecting the outer supporting panel 151 and the inner supporting panel 152 each other. A hand guarding belt connecting slot 154 is provided on the outer supporting panel 151 and the inner supporting panel 152 respectively for connecting the hand guarding belt (not shown), thereby connecting the wearer's wrist. A second wrist pneumatic muscle support 155 and a groove 156 suitable for hanging heavy objects are provided on both the inner supporting panel and the outer supporting panel.

Here, one end of the elbow pneumatic muscle element 6 is fixedly connected to the first elbow pneumatic muscle support 115, and the other end thereof is fixedly connected to the second elbow pneumatic muscle support 135 for driving pivotal movement of the elbow joint member. One end of the wrist pneumatic muscle element 7 is fixedly connected to the first wrist pneumatic muscle support 136, and the other end thereof is fixedly connected to the second wrist pneumatic muscle support 155 for driving pivotal movement of the wrist joint member.

Figure 8:
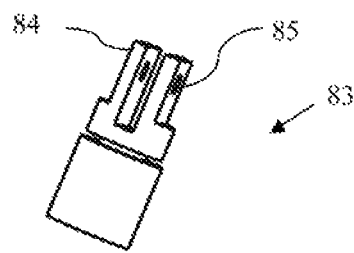
FIG. 8 is a schematic view of a hinged seat in a shoulder joint assembly according to the present disclosure.

In this embodiment, the shoulder joint assembly may include a curved shoulder connecting panel 8, a shoulder traction wheel 9, a shoulder traction line 10, a first hinge mechanism, and a second hinge mechanism. Here, the first hinge mechanism is a hinged shaft 81, and the second hinge structure includes a hinged shaft 82 and a hinged seat 83 rotatably received in the connecting sliding groove 214 of the back crossbeam 12 (see FIG. 8). The hinged seat is configured to have a cylindrical shape at one end and have a groove portion 84 adapted to receive the shoulder joint connecting panel 8 at the other end. A hole 85 is provided on each of two side walls of the groove portion. One end of the shoulder connecting panel 8 is pivotally connected to the hinged seat 83 through a cooperation between the hinged shaft 82 and the holes 85 to form an abduction-adduction revolute pair of the shoulder joint member; the other end of the shoulder connecting panel 8 is pivotally connected to the outer upper arm panel 111 of the upper arm assembly 11 by the hinged shaft 81 to form a bend-stretch revolute pair of the shoulder joint member.

It is advantageous to provide a connecting sliding groove 214 in the back crossbeam 21, as the width of the shoulder can be adjusted by moving the hinged seat 83 left and right in the connecting sliding groove as desired. When the position of the hinged seat is required to be fixed, the cooperation between the locking bolt and the positioning groove 215 allows the hinged seat 83 to be located in the connecting sliding groove 214 rotatably but non-linearly movably, thereby getting the desired width of the shoulder. Moreover, since the hinged seat 83 can be rotated in the connecting sliding groove 214 but cannot move linearly along the connecting sliding groove 214, a medial rotation-lateral rotation revolute pair of the shoulder joint is formed.

Figure 9:
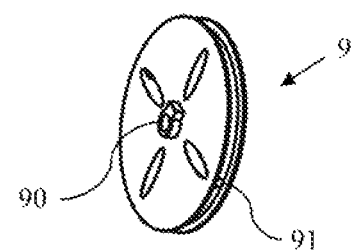
FIG. 9 is a schematic view of a shoulder traction wheel in a shoulder joint assembly according to the present disclosure.

As shown in FIG. 9, the shoulder traction wheel 9 is provided with a connecting shaft 90 integrally formed therewith at the center, and a fixing hole 91 is disposed on an outer peripheral surface of the shoulder traction wheel 9. The shoulder traction wheel 9 is fixed to the outer upper arm panel through cooperation between the connecting shaft 90 and a connecting hole of the outer upper arm panel 111, wherein one end of the shoulder traction line 10 is connected to the shoulder traction wheel 9 through the fixing hole 91, and the other end thereof is connected to the shoulder pneumatic muscle element 5. Advantageously, a shoulder traction line conduit 101 is further provided for guiding the shoulder traction line 10, and the shoulder traction line 10 may be partially wrapped around the shoulder traction wheel. In this embodiment, the shoulder traction line conduit 101 is similar to a casing pipe of a bicycle brake line, having both a certain rigidity and a certain flexibility, which not only functions well in guiding, but also does not hinder the movement of the shoulder joint member. When the human arms loose naturally, the shoulder pneumatic muscle element 5 is kept in a tension-free state. When the shoulder pneumatic muscle element 5 is inflated and expanded, the shoulder traction line 10 drives the shoulder traction wheel 9 to rotate, thereby driving pivotal movement of the upper arm member 11.

Figure 4:
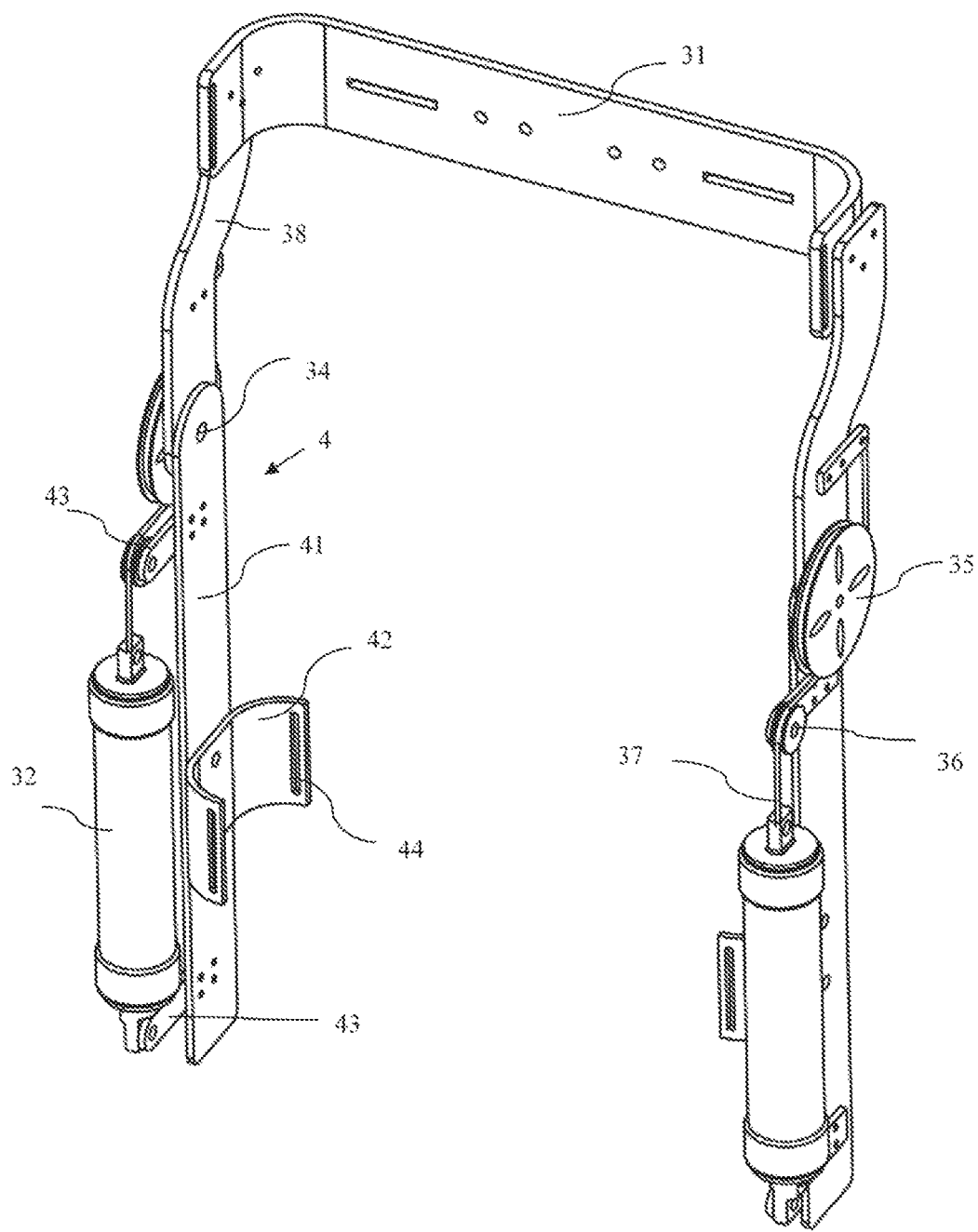
FIG. 4 is a schematic view of a waist structure and thigh structures of the assisted exoskeleton rehabilitation device shown in FIG. 1.
Figure 5:
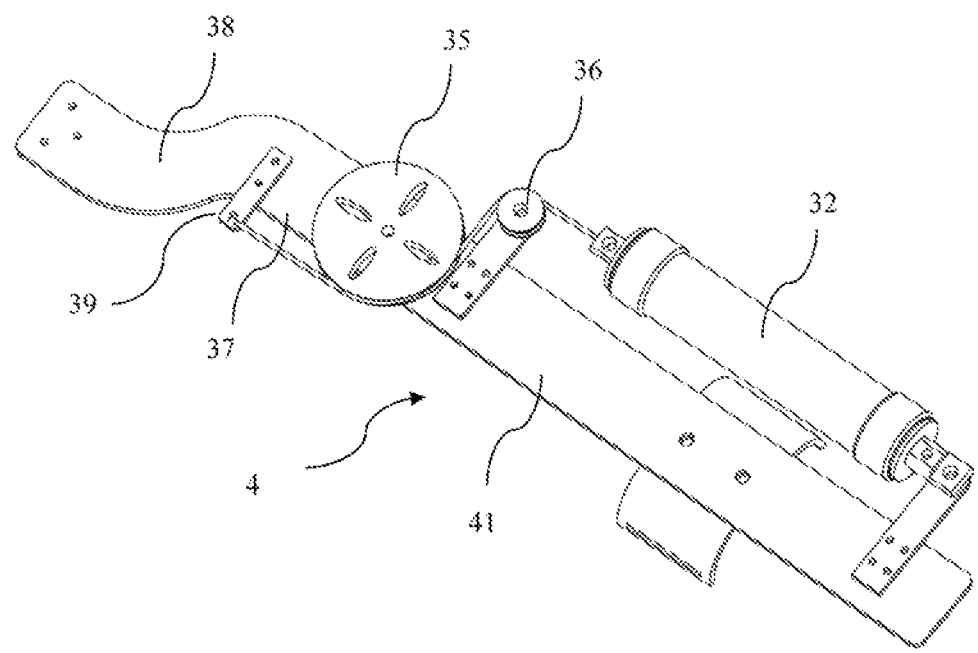
FIG. 5 is a schematic view of a thigh structure of the assisted exoskeleton rehabilitation device shown in FIG. 1.

As shown in FIGS. 4 and 5, the waist structure 3 includes a waist transverse panel 31 and a waist pneumatic muscle element 32 fixedly connected to a lower end of the back supporting panel 22. The thigh structure 4 includes a thigh panel 41 and a thigh guarding bracket 42, wherein a waist pneumatic muscle support 43 for mounting the waist pneumatic muscle element 32 is provided on the thigh panel 41, and a guarding belt connecting slot 44 is provided on the thigh guard 42 for connecting the thigh belt (not shown), thereby connecting the wearer's thigh. The hip joint assembly includes a waist connection panel 38 fixedly connected to the waist transverse panel 31, a hinged shaft 34, a first guide wheel 35 fixed to the waist connection panel 33, a second guide wheel 36 fixed to the thigh structure 4, and a waist traction line 37, wherein the hinged shaft 34 pivotally connects the waist connection panel 38 to the thigh panel 41 to form a bend-stretch revolute pair of the hip joint. A waist traction line fixing member 39 is further provided on the waist connection panel 38. One end of the waist traction line 37 extends through the second guide wheel 36 and the first guide wheel 35 and is fixed to the waist traction line fixing member 39 of the waist connection panel 38, and the other end thereof is connected to the waist pneumatic muscle element 32.

Since the two hip joints with the same structure each have a rotational degree of freedom, the assisted exoskeleton rehabilitation clothing can make bending and standing movement following the wearer. When the wearer's waist is upright, the waist pneumatic muscle element 32 is contracted to the shortest position, and the waist traction line 37 is pre-tightened. When the wearer's waist is bent, the waist pneumatic muscle element 32 is deflated, so that the hip joint rotates together with the waist to complete the bending action. During the stand-up process of the human body, the waist pneumatic muscle element 32 is inflated to drive the hip joint to rotate, thereby assisting the human waist.

As shown in FIG. 1, the assisted exoskeleton rehabilitation device of the present disclosure is designed in the bionic principle and is a bilaterally symmetrical structure. For the sake of convenience, the right half branch is now taken as an example to illustrate the pneumatic muscle control system for the assisted exoskeleton rehabilitation device.

Figure 11:
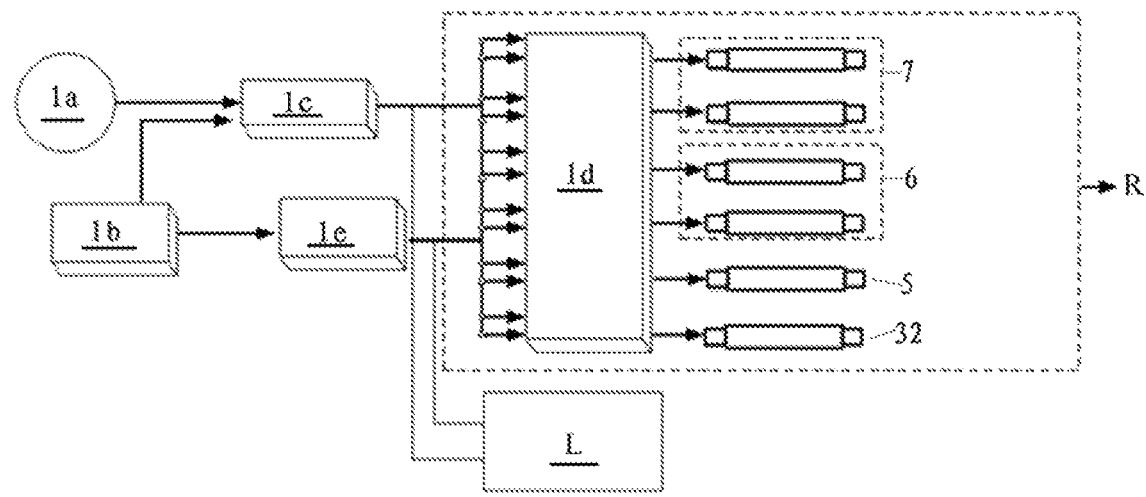
FIG. 11 is a schematic view of a pneumatic muscle control system according to the present disclosure.

As shown in FIG. 11, the pneumatic muscle control system includes a gas source generator 1a, a controller 1b, a pneumatic pressure reducing valve 1c, a left half branch L, a right half branch R, and a driving circuit board 1e. The gas source generator 1a is connected to the left half branch L and the right half branch R respectively by the pneumatic pressure reducing valve 1c, the controller 1b is connected to the pneumatic pressure reducing valve 1c and the driving circuit board 1e, respectively, and the driving circuit board 1e is also connected to the left half branch L and the right half branch R respectively. Here, the left half branch and the right half branch are identical in structure, and only the right half branch is described here. The right half branch includes a solenoid valve group 1d, and a shoulder pneumatic muscle element 5, a waist pneumatic muscle element 32, an elbow pneumatic muscle element 6, and a wrist pneumatic muscle element 7 respectively connected to the solenoid valve group, wherein the driving circuit board 1e is disposed between the controller and the solenoid valve group; the controller is configured to control the pneumatic pressure reducing valve to decompress the gas from the gas source generator; the signal input end of the solenoid valve group is connected to the driving circuit board, and the driving circuit board is configured to receive a preset control instruction from the controller.

The gas source generator 1a can generate sufficient gas source, which is stored in a gas cylinder. The gas source generator can set the highest pressure value of the gas source, automatically start and stop, and complement the gas. The gas comes out from the gas source generator, and the maximum pressure of gas entering the pneumatic muscle element is controlled by the pneumatic pressure reducing valve 1c. Generally, the pressure value of gas out of the gas source generator is higher than the working pressure value, so the pneumatic pressure reducing valve is required for depressurization treatment. The decompressed gas is discharged into the solenoid valve group 1d, and the gas from the solenoid valve group is connected to a charging connector on the corresponding pneumatic muscle element through a gas pipe. Within the solenoid valve group, it is available that inflation, deflation, and maintenance of each pneumatic muscle element are controlled through cooperation between two 2-position 2-way solenoid sub-valves, or they are controlled solely by one 3-position 3-way solenoid sub-valve. The right half branch is divided into a wrist pneumatic muscle element 7, an elbow pneumatic muscle element 6, a shoulder pneumatic muscle element 5, and a waist pneumatic muscle element 32. For the wrist pneumatic muscle element 6, when the controller issues an inflation command, the inlet of the branch of the solenoid valve group corresponding to the wrist pneumatic muscle element will open, and then the gas enters the interior of the pneumatic muscle element through the gas pipe. When the wrist member reaches the specified bending angle, the controller will issue a power-off command. At this time, all the branches of the solenoid valve group corresponding to the wrist pneumatic muscle element are closed, and the gas inside the pneumatic muscle element is enclosed inside the pneumatic muscle element and maintained at the original position. When the controller issues a deflation command, the gas vent of the solenoid valve group corresponding to the wrist pneumatic muscle element 7 is opened, the gas inside the wrist pneumatic muscle element 7 is released, and the wrist pneumatic muscle element is returned to its initial state. The elbow pneumatic muscle element works in the same principle as the shoulder pneumatic muscle element and the waist pneumatic muscle element, and the left half branch works in a same principle as the right half branch, so we will not repeat them now.

When the wearer wears the assisted exoskeleton rehabilitation device according to the present disclosure, the flexible belt on the human shoulder enables flexible connection between the back structure and the back of the wearer, and the upper arm assembly 11, the forearm assembly 13 and the hand assembly 15 are connected flexibly to the wearer's hands and arms by corresponding guarding belts. The human hands and arms are placed in the assisted exoskeleton rehabilitation device, and the thigh structure 4 is flexibly connected to the wearer's legs by the leg guarding bracket 42 and the thigh belt. When the wearer lifts a heavy object, the wrist pneumatic muscle element 7, the elbow pneumatic muscle element 6, and the shoulder pneumatic muscle element 5 are inflated, and each of the pneumatic muscle elements is inflated and expanded, wherein the wrist pneumatic muscle element 7 drives the wrist joint to rotate, the elbow pneumatic muscle element 6 drives the elbow joint to rotate, and the shoulder pneumatic muscle element 5 bypasses the shoulder traction wheel by means of the shoulder traction line to drive the upper arm assembly 11 to rotate. At this time, the forearm guarding bracket is attached tightly to the wearer's forearm, and the upper arm guarding bracket is attached tightly to the wearer's upper arm, thereby the arm is moved upwards to complete the process of lifting the heavy object. When the wearer needs to put down the heavy object, each of the pneumatic muscle elements is deflated, and the two arms assisted by the assisted exoskeleton rehabilitation device move downward under the gravity of the heavy object to complete the process of dropping the heavy object. In the working process, the speed of arm movement is changed by adjusting the inflation and deflation speed. When the wearer's waist bends in the process of lifting the heavy object, the waist pneumatic muscle element 32 is deflated, causing the hip joint of the exoskeleton rehabilitation assisting clothing to rotate following the bending of the human waist. When the wearer's waist is upright, the waist pneumatic muscle element 32 is inflated, which drives the hip joint of the assisted exoskeleton rehabilitation device to rotate, thus driving the back movement of the human body to boost the wearer's waist. Throughout the work, the stress on the assisted exoskeleton rehabilitation device is concentrated on the shoulders and legs of the wearer. In this way, the stress on the muscles of human arms and waist are transferred to the bones of the human body.

The present disclosure can not only assist the persons with muscle damage or the elderly with weak muscle ability, but also help the patients with arm injury or waist injury to complete daily rehabilitation training, so that their body function can be quickly restored.

The present disclosure is disclosed in example embodiments above, but the present disclosure is not limited thereto. Any variation or modification made by a person skilled in the art without departure from the spirit and scope of the present disclosure shall be included in the protection scope of the present disclosure. Therefore, the protection scope of the present disclosure shall be determined by the protection scope of the claims.

What is claimed is:

1. An assisted exoskeleton rehabilitation device comprising:
   a back structure comprising a back crossbeam, a back supporting panel with an adjustable length, and a shoulder pneumatic muscle element mounted on the back supporting panel;
   an arm structure;
   a shoulder joint assembly that connects the arm structure to an upper end of the back structure;
   a waist structure, the waist structure comprising a waist transverse panel fixedly connected to the lower end of the back supporting panel and a waist pneumatic muscle element mounted on each thigh structure;
   and two thigh structures and a hip joint assembly, the two thigh structures connected to the waist structure by the hip joint assembly, respectively, wherein the hip joint assembly comprises a waist connection panel fixedly connected to the waist transverse panel, a hinged shaft, a first guide wheel fixed to the waist connection panel, a second guide wheel fixed to the thigh structure, and a waist traction line, wherein the waist connection panel is connected to the thigh structure by the hinged shaft to form a bend-stretch revolute pair of the hip joint, wherein one end of the waist traction line extends through the second guide wheel and the first guide wheel, and is fixed to the waist connection panel, and wherein the other end of the waist traction line is connected to the waist pneumatic muscle element;
   wherein an upper end of the back supporting panel is fixedly connected to the back crossbeam, wherein a lower end of the back supporting panel is fixedly connected to the waist structure, wherein the shoulder joint assembly comprises a curved shoulder joint connecting panel, a shoulder traction wheel, a shoulder traction line, a first hinge mechanism, and a second hinge mechanism, wherein one end of the shoulder joint connecting panel is connected to an upper end of the arm structure by the first hinge mechanism to form a bend-stretch revolute pair of the shoulder joint assembly, wherein the other end of the shoulder joint connecting panel is connected to the back crossbeam by the second hinge mechanism to form an abduction-adduction revolute pair and a medial rotation-lateral rotation revolute pair of the shoulder joint assembly, wherein the shoulder traction wheel is fixed to the upper end of the arm structure, and wherein the shoulder traction line is connected to the shoulder traction wheel at one end, and to the shoulder pneumatic muscle element at the other end.

2. The assisted exoskeleton rehabilitation device according to claim 1, wherein each thigh structure comprises a thigh panel and a thigh guarding bracket, wherein a waist pneumatic muscle support is provided on the thigh panel for mounting the waist pneumatic muscle element, and wherein a belt connection groove is provided on the thigh guarding bracket for connecting a thigh belt.

3. The assisted exoskeleton rehabilitation device according to claim 1, further comprising two arm structures, each of which comprises an upper arm assembly, an elbow joint member, a forearm assembly, a wrist joint member, and a hand assembly, wherein an upper end of the upper arm assembly is connected to the shoulder joint connecting panel by the first hinge mechanism, and wherein a lower end of the upper arm assembly is connected to the forearm assembly by the elbow joint member to form a bend-stretch revolute pair of an elbow joint assembly, while the forearm assembly is connected to the hand assembly by the wrist joint member to form a bend-stretch revolute pair of a wrist joint assembly.

4. The assisted exoskeleton rehabilitation device according to claim 3, wherein each of the upper arm assemblies comprises an outer upper arm panel, an inner upper arm panel, and an upper arm guarding bracket for fixedly connecting the outer upper arm panel and the inner upper arm panel to each other, wherein each of the forearm assemblies comprises an outer forearm panel, an inner forearm panel, and a forearm guarding bracket for fixedly connecting the outer forearm panel and the inner forearm panel to each other, wherein each hand assembly comprises an inner supporting panel, an outer supporting panel, and a hand guarding bracket for fixedly connecting the inner supporting panel and the outer supporting panel to each other, wherein each of the outer upper arm panel and the inner upper arm panel is provided with a first elbow pneumatic muscle support, wherein each of the outer forearm panel and the inner forearm panel is provided with a second elbow pneumatic muscle support and a first wrist pneumatic muscle support, wherein each of the inner supporting panel and the outer supporting panel is provided with a second wrist pneumatic muscle support, wherein an elbow pneumatic muscle element is mounted on the first elbow pneumatic muscle support and the second elbow pneumatic muscle support, respectively, for driving a pivotal movement of the elbow joint assembly, and wherein a wrist pneumatic muscle element is mounted on the first wrist pneumatic muscle support and the second wrist pneumatic muscle support for driving a pivotal movement of the wrist joint assembly.

5. The assisted exoskeleton rehabilitation device according to claim 4, further comprising an upper arm guarding belt, a forearm guarding belt, and a hand guarding belt, wherein an upper arm guarding belt connecting slot is provided on both the outer upper arm panel and the inner upper arm panel for connecting the upper arm guarding belt, wherein a forearm guarding belt connecting slot is provided on both the outer forearm panel and the inner forearm panel for connecting the forearm guarding belt, wherein a hand guarding belt connecting slot is provided on both the inner supporting panel and the outer supporting panel for connecting the hand guarding belt, and wherein a groove for hanging heavy objects is provided on both the inner supporting panel and the outer supporting panel.

6. The assisted exoskeleton rehabilitation device according to claim 1, wherein the back crossbeam comprises two ends, wherein both ends of the back crossbeam are respectively provided with a sliding groove, wherein the second hinge mechanism comprises a hinged shaft and a hinged seat, wherein the hinged seat is configured to have a cylindrical shape at one end, and a groove portion, wherein the groove portion comprises two side walls, wherein the groove portion is adapted to receive the shoulder joint connecting panel at the other end of the hinged seat, wherein each of the two side walls of the groove portion is provided with an opening, wherein the shoulder joint connecting panel is connected to the hinged seat through a cooperation between the hinged shaft and the opening to form the abduction-adduction revolute pair of the shoulder joint assembly, and wherein the cylindrical end of the hinged seat is rotatably received in the sliding groove and located by a positioning bolt to block the hinged seat from moving linearly within the sliding groove, so as to form the medial rotation-lateral rotation revolute pair of the shoulder joint assembly.

7. The assisted exoskeleton rehabilitation device according to claim 1, wherein a shoulder traction line conduit is further provided for guiding the shoulder traction line, and wherein a waist traction line fixing member is disposed on the waist connection panel for fixing the waist traction line.

8. The assisted exoskeleton rehabilitation device according to claim 1, wherein the back supporting panel comprises two supporting panels, each of the supporting panels having a first section and a second section that are slidable relative to each other such that a length of the back supporting panel is adjustable, and thereby a waist position is adjustable, wherein a positioning sliding groove is disposed on the first section and the second section respectively, and wherein the first section and the second section can be fastened through a cooperation between the positioning sliding groove and a locking screw.

9. An exoskeleton rehabilitation assisting system, comprising a control system and an assisted exoskeleton rehabilitation device according to claim 1, the control system comprising a gas source generator, a controller, a pneumatic pressure reducing valve, a solenoid valve group connected to each of a shoulder pneumatic muscle element, a waist pneumatic muscle element, an elbow pneumatic muscle element and a wrist pneumatic muscle element, respectively, and a driving circuit board disposed between the controller and the solenoid valve group, wherein the controller is for controlling the pneumatic pressure reducing valve to decompress a gas from the gas source generator, and wherein a signal input end of the solenoid valve group is connected to the driving circuit board which is configured to receive a preset control instruction from the controller.

10. A method for controlling an assisted exoskeleton rehabilitation device according to claim 1, comprising:
    providing an assisted rehabilitation device according to claim 1;
    controlling a pneumatic pressure reducing valve to decompress a gas from a gas source generator by a controller; and
    controlling a solenoid valve group respectively connected to a shoulder pneumatic muscle element, a waist pneumatic muscle element, an elbow pneumatic muscle element, and a wrist pneumatic muscle element based on a control instruction from the controller, so as to control inflation and deflation of the shoulder pneumatic muscle element, the waist pneumatic muscle element, the elbow pneumatic muscle element, and the wrist pneumatic muscle element.

* * * * *

UNITED STATES PATENT AND TRADEMARK OFFICE
CERTIFICATE OF CORRECTION

| | |
|---|---|
| PATENT NO. | : 11,571,352 B2 |
| APPLICATION NO. | : 16/488730 |
| DATED | : February 7, 2023 |
| INVENTOR(S) | : Bangcan Xue et al. |

It is certified that error appears in the above-identified patent and that said Letters Patent is hereby corrected as shown below:

On the Title Page

In item (57), in Abstract, delete "The present disclosure relates to an assisted exoskeleton rehabilitation device, comprising: a back structure comprising a back crossbeam, a back supporting panel with an adjustable length, and a shoulder pneumatic muscle element mounted on the back supporting panel; an arm structure; a shoulder joint assembly, by which the arm structure is connected to an upper end of the back structure; and a waist structure. An upper end of the back supporting panel is fixedly connected to the back crossbeam, and a lower end thereof is fixedly connected to the waist structure. The shoulder joint assembly comprises a curved shoulder joint connecting panel, a shoulder traction wheel, a shoulder traction line, a first hinge mechanism and a second hinge mechanism. One end of the shoulder joint connecting panel is connected to the upper end of the arm structure by the first hinge mechanism to form a bend-stretch revolute pair of the shoulder joint, and the other end of the shoulder joint connecting panel is connected to the back crossbeam by the second hinge mechanism to form an abduction-adduction revolute pair and a medial rotation-lateral rotation revolute pair of the shoulder joint assembly, and the shoulder traction wheel is fixed to the upper end of the arm structure. The shoulder traction line is connected at one end to the shoulder traction wheel, and connected to the shoulder pneumatic muscle element at the other end." and insert therefor -- An assisted exoskeleton rehabilitation device includes a back structure including a back crossbeam, a back supporting panel with an adjustable length, and a shoulder pneumatic muscle element mounted on the back supporting panel, an arm structure, a shoulder joint assembly, by which the arm structure is connected to an upper end of the back structure, and a waist structure. An upper end of the back supporting panel is fixedly connected to the back crossbeam, and a lower end thereof is fixedly connected to the waist structure. The shoulder joint assembly includes a curved shoulder joint connecting panel, a shoulder traction wheel, a shoulder traction line, a first hinge mechanism, and a second hinge mechanism. --.

Signed and Sealed this
Twenty-first Day of March, 2023

*Katherine Kelly Vidal*
Katherine Kelly Vidal
*Director of the United States Patent and Trademark Office*